UNITED STATES PATENT OFFICE.

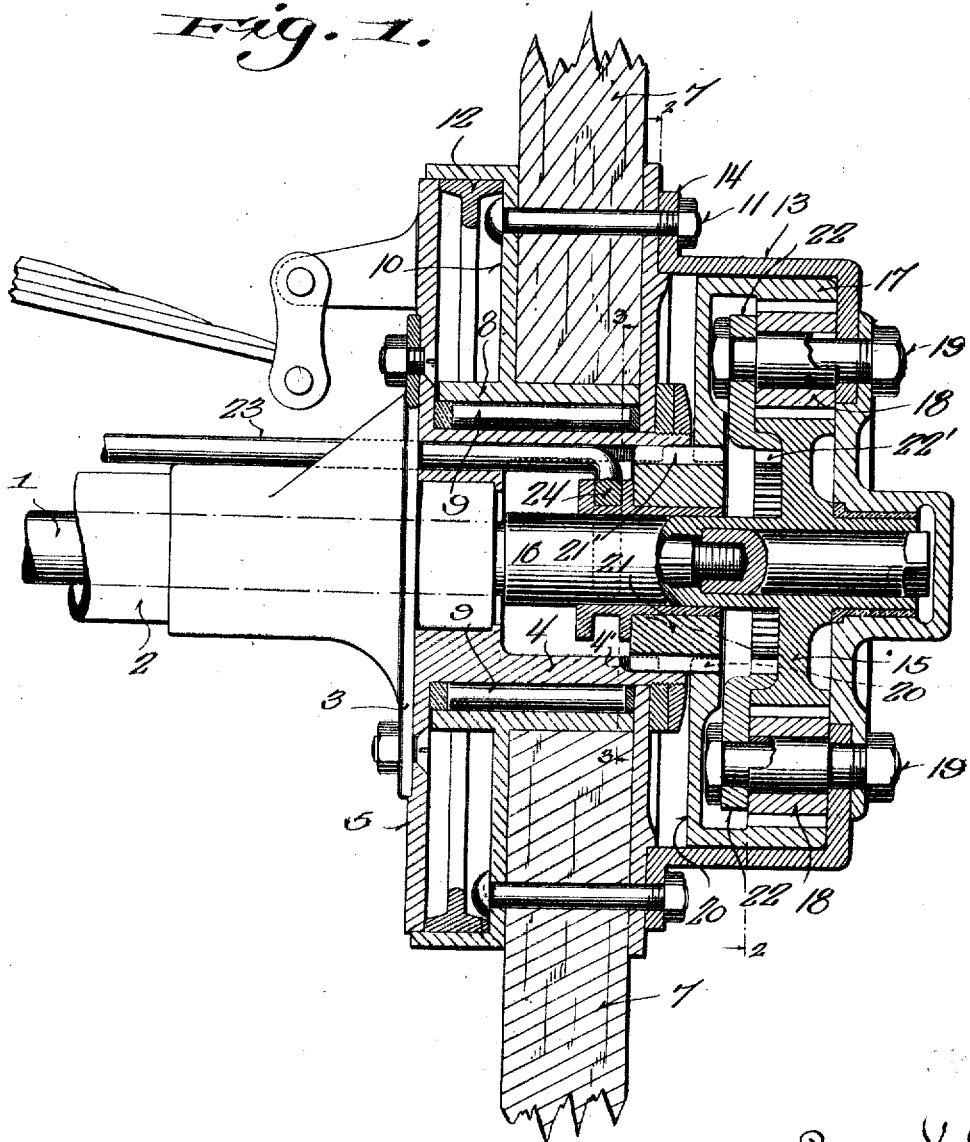

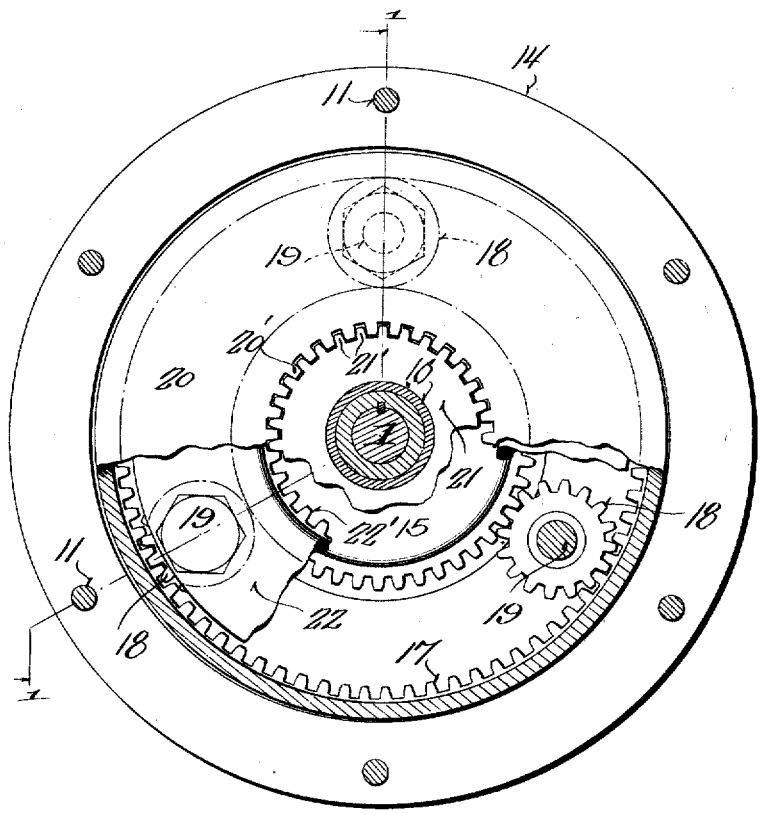

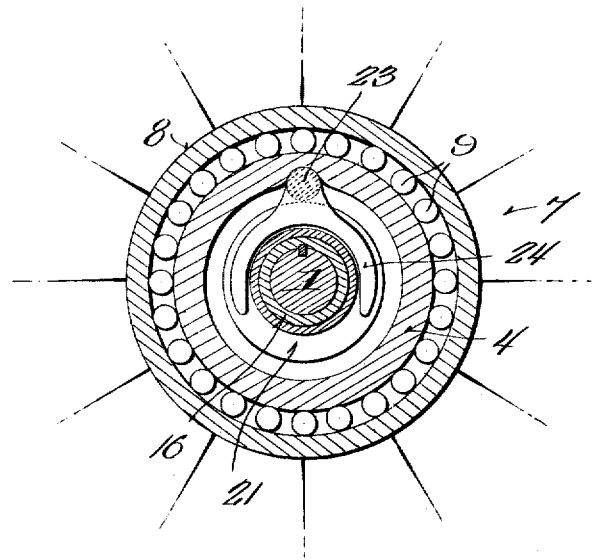
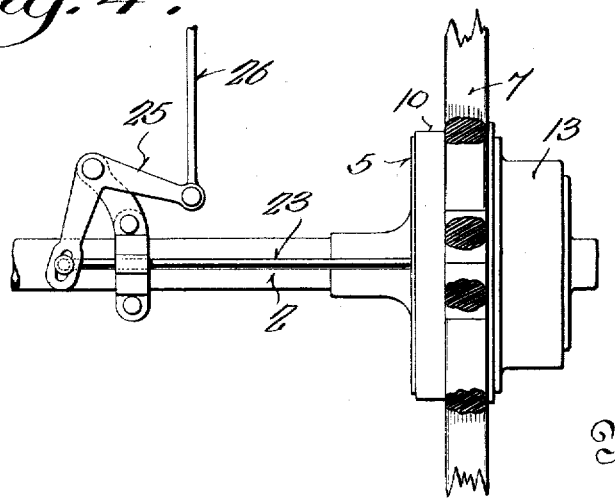

JOHN E. OVREN, OF STOUGHTON, WISCONSIN, ASSIGNOR OF ONE-HALF TO JOKUM JOHNSON, OF STOUGHTON, WISCONSIN.

TRANSMISSION MECHANISM.

1,301,592.                Specification of Letters Patent.      Patented Apr. 22, 1919.

Application filed October 13, 1917.   Serial No. 196,399.

*To all whom it may concern:*

Be it known that I, JOHN E. OVREN, a citizen of the United States, and resident of Stoughton, in the county of Dane and State of Wisconsin, have invented certain new and useful Improvements in Transmission Mechanisms; and I do hereby declare that the following is a full, clear, and exact description thereof.

My invention refers to new and useful improvements in transmission mechanisms for vehicles, such as automobiles, tractors and the like.

In some classes of vehicles particularly farm tractors it is essential that a variable speed connection be provided between the drive wheels and the driving axle, this being much more efficient in these classes of machines than the usual transmission mechanisms found on commercial and pleasure vehicles. It is, therefore, the primary object of the invention to provide an extremely simply constructed transmission mechanism of the planetary type for use on motor vehicles.

It is a less important object of the invention to provide an arrangement whereby all of the operating mechanisms may be mounted in a compact casing secured upon the vehicle wheel.

It is also an object of the invention to provide a simple and novel means for changing the speed of rotation of the wheels with respect to their driving axle.

With these and other objects in view the invention resides in the novel features of construction, combination and arrangement of parts which will be hereinafter more particularly described and claimed and shown in the drawings, wherein:

Figure 1 represents a substantially vertical sectional view taken approximately upon the plane of the line 1—1 of Fig. 2.

Fig. 2 is a vertical transverse section through the planetary gear.

Fig. 3 is a similar view taken substantially on the plane of the line 3—3 of Fig. 1, and Fig. 4 is a detail plan view of a portion of the drive axle of a motor vehicle showing the spokes of one wheel in section, and illustrating more particularly one means for changing the speed of rotation of the wheels.

In the accompanying drawings a rear axle construction of conventional design has been illustrated, the same including a driving axle 1 which is caused to rotate by a suitable power plant (not shown), and a relatively stationary casing 2 surrounding the same. The casing terminates inwardly of the end of the axle and is provided with a radial attaching flange 3 to which is secured a bearing sleeve 4 by means of the circular plate 5, the last mentioned part and the flange 3 being fixed together by the bolts and nuts 6.

The wheel 7 is designed to revolve on the sleeve 4, its annular hub lining 8 being spaced therefrom to permit the insertion of a number of roller bearings 9. The hub lining has a brake housing 10 carried thereby, the same being also fixed to the wheel by means of bolts 11. One wall of the brake housing is formed by the plate 5 and therein is mounted a brake 12 of conventional design.

The brake housing as illustrated in Fig. 1 is secured to the inner face of the wheel 7, while to the outer side thereof is secured a cup shaped gear housing 13, the open side thereof having an annular flange 14 provided with a number of bolt openings to receive the shanks of the bolts 11. It is within this housing 13 and sleeve 4 that all of the operating parts of my invention are disposed. It will be seen from Fig. 4 that in view of this arrangement a very neatly constructed and appearing wheel has been produced.

The planetary gear disposed within the housing 13 comprises a master spur gear 15 mounted on, or formed integrally, with a relatively long sleeve 16, an internal gear 17, and a plurality of pinions 18 whose teeth mesh with the teeth of the gears 15 and 17. By means of the sleeve 16 the master gear 15 is fixed to the axle 1 so as to revolve therewith; the pinions 18 are carried by the housing 13, being attached thereto by the bolts 19.

The internal gear 17 is formed on a circular plate 20 which is provided with an aperture substantially the same size as the opening to the sleeve 4, the wall of this aperture being provided with gear teeth 20′ for engagement with the teeth 21′ formed on the periphery of a locking member 21, said member being preferably in the form of a spur gear. The inner wall of the outer end of the sleeve 4 is also provided with teeth 4' for coöperation with the teeth on the gear 21. Mounted between the master gear 15 and the plate 20 is a second plate 22, the same being secured to the housing 13 by the bolts 19. The aperture which is provided in this plate 22 has its wall cut to form gear teeth 22' which are also adapted to be engaged by the teeth of the gear 21.

This gear 21 is designed to slide on the sleeve 16 and is rotatable independently thereof, it being moved by means of a gear shift rod 23 having on one end a spanner 24 which is arranged substantially as shown in Fig. 3. Fig. 4 shows one means whereby the gear shifting rod 23 may be actuated, this consisting of a bell crank 25 and a connecting rod 26 which extends to a suitable actuating lever (not shown) disposed adjacent the driver's seat of the vehicle.

This invention is so constructed that the wheel may be caused to rotate at two different speeds, namely, a low and a high speed, the latter being a direct drive between the axle 1 and the wheel 7. There is also a neutral position whereby the wheel may be entirely disconnected from the axle 1. When the parts are arranged in low speed they will appear as illustrated in Fig. 1, in which case the internal gear 17 is held relatively stationary, it being fixed to the casing 2 because of the engagement of the gear teeth 21' with the teeth 4' and 20'. The axle 1 is then driving through the master gear 15, the pinions 18 and the internal gear so that the rotative speed of said axle is suitably reduced by the time it is transmitted to the wheel 7.

When in high speed the gear 21 will lock the internal gear 17 to the housing 13, the teeth 21' being then in mesh with the teeth 20' and 22' of the plates 20 and 22 respectively. The axle will then be driving directly to the wheel 7.

The neutral position of the parts is secured by shifting the gear 21 until its teeth are out of engagement with both the teeth 4' and the teeth 22', the internal gear 17 being then free to rotate at will. In this case the energy of the axle 1 will be expended in rotating the master gear 15 and the pinions 18 without actuating the wheel 7.

From the foregoing description taken in connection with the accompanying drawings it will be seen that a simply constructed transmission mechanism has been provided which can be housed in a relatively small space upon the drive wheels of an automobile or other motor vehicle. This construction will be found to be particularly useful in farm tractors and other similar machines, the low speed being used when the tractor is in active operation on soft ground, while the high speed is used when the machine is traveling over a road.

I claim:

1. A transmission mechanism of the class described comprising a drive axle, a wheel therefor, a master gear rotatable with the axle, an internal gear, a pinion carried by the wheel and meshing with the master gear and internal gear, and a locking member movable with respect to the internal gear and with respect to the wheel and engaging the internal gear for selectively holding the internal gear against rotation to procure a reduced speed of the wheel with respect to said drive axle, or for locking the internal gear to the wheel to rotate the wheel directly from its drive axle.

2. A transmission mechanism of the class described including a casing, a bearing sleeve carried by the casing, a drive axle extended through the casing and sleeve, a wheel journaled on the bearing sleeve, a master gear carried by the axle outwardly of the wheel, an internal gear, a pinion carried by the wheel and meshing with the master gear and the internal gear, a locking member loosely slidable on the axle and connected with the internal gear and adapted respectively for connection with either the sleeve or the wheel to lock the internal gear against rotation with respect to either the bearing sleeve or the wheel, and means extending through the bearing sleeve for sliding said locking member.

3. In a machine of the class described, a drive axle, a wheel therefor, a master gear rotatable with the axle, an internal gear, a pinion connected with the wheel and with the master and internal gears, a sliding locking members continuously connected with said internal gear, a relatively stationary retaining member, a locking member engaging means carried by said wheel, and means for shifting the locking member either into engagement with the retaining member whereby to hold the internal gear relatively stationary, or with said engaging means whereby to fix the internal gear to the wheel.

4. In a mechanism of the class described, a drive axle, a wheel therefor, a master gear rotatable with the axle, an internal gear, an apertured plate connected to said internal gear and having teeth formed in the wall of its aperture, a pinion connected with the wheel and with the master and internal gears, a second apertured plate carried by the wheel, said plate having teeth formed in the wall of its aperture, and a slidable gear engageable with the teeth of the first plate for selectively holding the internal gear relatively stationary or locking the same to the wheel by engagement with the teeth of the second plate, whereby to change the speed of said wheel.

5. A transmission mechanism of the class described including a casing, a bearing sleeve carried by the casing, a drive axle extended through the casing and sleeve, a wheel journaled on the bearing sleeve, a master gear carried by the axle outwardly of the wheel, an internal gear wheel including a body plate disposed between the wheel and master gear, a second plate disposed between the body plate of the internal gear and the master gear, a casing carried by the wheel and surrounding the master gear and internal gear, shafts secured in the outer wall of the casing and the second named plate, pinions on said shafts meshing with the master gear and internal gear, clutch teeth on the bearing sleeve, clutch teeth on the body plate of the internal gear, clutch teeth on the second plate, a clutch member slidably engageable with the teeth of the body plate of the internal gear and selectively engageable with either the clutch teeth of the bearing sleeve or the clutch teeth of the second plate, and means for shifting said clutch member.

In testimony that I claim the foregoing I have hereunto set my hand at Stoughton, in the county of Dane, and State of Wisconsin.

JOHN E. OVREN.

Copies of this patent may be obtained for five cents each, by addressing the "Commissioner of Patents, Washington, D. C."